United States Patent
Bruno et al.

(10) Patent No.: US 8,195,409 B2
(45) Date of Patent: Jun. 5, 2012

(54) PASSIVE ACOUSTIC UNDERWATER INTRUDER DETECTION SYSTEM

(75) Inventors: Michael Bruno, Hoboken, NJ (US);
Barry Bunin, Far Hills, NJ (US);
Laurent Fillinger, Hoboken, NJ (US);
Howard Goheen, Manahawkin, NJ (US); Alexander Sedunov, Jersey City, NJ (US); Nikolay Sedunov, Jersey City, NJ (US); Alexander Sutin, Summit, NJ (US); Mikhail Tsionskiy, East Rutherford, NJ (US); Jeremy Turner, Hoboken, NJ (US); Malcolm Kahn, Franklin Lakes, NJ (US); Hady R. Salloum, Glen Ridge, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 0 days.

(21) Appl. No.: 12/938,708

(22) Filed: Nov. 3, 2010

(65) Prior Publication Data
US 2011/0144930 A1    Jun. 16, 2011

Related U.S. Application Data

(60) Provisional application No. 61/280,402, filed on Nov. 3, 2009.

(51) Int. Cl.
*G01F 17/00*    (2006.01)
(52) U.S. Cl. .............................................. 702/56
(58) Field of Classification Search ............... 702/56
See application file for complete search history.

(56) References Cited

U.S. PATENT DOCUMENTS

| | | | |
|---|---|---|---|
| 4,975,886 A | 12/1990 | Ellingson | |
| 5,034,930 A | 7/1991 | Clearwaters | |
| 5,099,456 A | 3/1992 | Wells | |
| 5,138,587 A | 8/1992 | Mason | |
| 5,146,208 A * | 9/1992 | Parra | 340/573.6 |
| 5,278,774 A | 1/1994 | Wilson | |
| 5,377,162 A | 12/1994 | Jestin et al. | |
| 5,410,519 A | 4/1995 | Hall et al. | |
| 5,557,584 A | 9/1996 | Suchman | |
| 5,841,735 A | 11/1998 | Quazi | |
| 5,909,409 A | 6/1999 | Barber et al. | |

(Continued)

OTHER PUBLICATIONS

Written Opinion and Search Report mailed on Mar. 21, 2011 in connection with PCT/US10/55230 for Passive Acoustic Underwater Intruder Detection System filed Nov. 3, 2010.

(Continued)

*Primary Examiner* — Cindy H Khuu
(74) *Attorney, Agent, or Firm* — Greenberg Traurig, LLP (57) ABSTRACT

A portable threat detection apparatus and method is disclosed which may comprise a plurality of acoustic emission sensors arranged in a cluster, forming a polygon defining at least two axes of alignment between respective pairs of acoustic emission sensors; a computing device in cooperation with a non-transitory computer readable storage medium comprising computer readable instructions for performing: receiving a first signal produced by a first acoustic emission sensor within a respective pair of acoustic emission sensors, in response to the first acoustic emission sensor detecting an acoustic emission from a source, and receiving a second signal produced by a second acoustic emission sensor within the respective pair of acoustic emission sensors, in response to the second acoustic emission sensor detecting the acoustic emission; determining a cross-correlation factor between the first signal and the second signal; and, determining a bearing to the source based on the cross correlation factor.

29 Claims, 6 Drawing Sheets

U.S. PATENT DOCUMENTS

| | | | |
|---|---|---|---|
| 6,082,193 A * | 7/2000 | Paulson | 73/152.58 |
| 6,160,758 A | 12/2000 | Spiesberger | |
| 7,245,559 B2 | 7/2007 | McDonald et al. | |
| 7,266,044 B2 | 9/2007 | Yang | |
| 7,457,198 B2 | 11/2008 | Stein et al. | |
| 7,463,554 B2 | 12/2008 | Kervern | |
| 2003/0222778 A1 | 12/2003 | Piesinger | |
| 2004/0141419 A1 | 7/2004 | Hicks et al. | |
| 2006/0159524 A1 | 7/2006 | Thompson et al. | |
| 2008/0165617 A1 | 7/2008 | Abbot et al. | |
| 2009/0257312 A1 | 10/2009 | Novick et al. | |
| 2011/0007606 A1 * | 1/2011 | Curtis | 367/103 |

OTHER PUBLICATIONS

A. Sedunov, et al., "Automated passive acoustic intruder detection based on correlation approach," J. Acoust. Soc. Am. vol. 124, Issue 4, pp. 2561-2561 (Oct. 2008).

J. Spiesberger, "Identifying Cross-Correlation Peaks Due to Multipaths with Application to Optimal Passive Localization of Transient Signals and Tomographic Mapping of the Environment," J. Acoust. Soc. Am. vol. 100, No. 2, Pt 1. pp, 910-917 (Aug. 1996).

A. Quazi, "An Overview of the Time Delay Estimate in Active and Passive Systems for Target Localization," IEEE Trans. Acoust., Speech, Signal Processing, vol. ASSP-29, No. 3, pp. 527-533 (Jun. 1961).

G.R. Mellema, Correlation Based Testing for Passive Sonar Picture Rationalzation. Defense R&D Canada—Atlantic, Dartmouth, Information Fusion, 2007 10th International Conference.

R.E. Zamich, "A Fresh Look at Broadband Passive Sonar Processing," 1999 Adaptive Sensor Array Processing Workshop (ASAP '99), MIT Lincoln Laboratory, Lexington, MA, pp. 99-104 (Mar. 1999).

B. Xerri, et al., "Passive Tracking in Underwater Acoustic," (2002) Signal Processing, 82 (8), pp. 1067-1085.

* cited by examiner

PASSIVE ACOUSTIC UNDERWATER INTRUDER DETECTION SYSTEM

RELATED CASES

The present application claims priority to U.S. Provisional Patent Application No. 61/280,402, entitled PASSIVE ACOUSTIC UNDERWATER INTRUDER DETECTION SYSTEM, filed on Nov. 3, 2009.

STATEMENT REGARDING FEDERALLY SPONSORED RESEARCH

Some of the research performed in the development of the disclosed subject matter was supported by the U.S. Office of Naval Research Project #N00014-05-1-0632, Navy Force Protection Technology Assessment Project. The U.S. government may have certain rights with respect to this application.

FIELD OF THE INVENTION

The present invention relates to a portable easily deployed and recovered multi-transducer hydro-acoustic detection system that can detect the presence and location of sources of hydro-acoustic emissions produced by an intruder (e.g., diver, surface swimmer, unmanned underwater vehicle ("UUV"), surface vessels, etc.) or other man-made sounds (e.g., a pump discharging, a generator running on a pier), or natural causes (e.g., fish, mammals, etc.), and can characterize the type of source causing the emissions, the bearing to the source and the direction the source is moving and its location. The claimed subject matter may be used for security against illegal activities, intruders, and terrorism.

BACKGROUND OF THE INVENTION

Since the bombing of the USS Cole in October 2000 and the attacks of 9/11, border and transportation security have become a priority for the Navy and the Department of Homeland Security, especially for the U.S. Coast Guard. One of the most challenging aspects of port security is providing the means to protect against threats from under the surface of the water as well as surface threats, such as vessels of all sizes, including small, fast boats. In particular, it is felt that a significant terrorist threat might be posed to domestic harbors in the form of an explosive device delivered underwater by a diver using an underwater breathing apparatus, such as SCUBA gear.

Existing hydro-acoustic detection systems may use either active or passive SONAR. Limitations on active SONAR include a high level of false alarms produced by scattering from fish and marine mammals, or the bottom in shallow water, the possibility of being detected by an intruder, the possibility of being harmful to marine mammals, and a possible need to be large and heavy (hundreds of pounds) to be effective. Some passive systems may utilize hundreds of sensors in an array, and may also need to be large and heavy to work effectively, or may need to be deployed more or less permanently over a widespread area where the area of interest is known a priori, and may cover wide reaching areas, but not smaller areas, such as a harbor or breakwater entry, a ship berth or mooring, a remote beach being defended or monitored, etc.

SUMMARY OF THE INVENTION

The presently disclosed subject matter relates to a portable easily deployed and recovered multi-transducer hydro-acoustic detection system that can detect the presence and location of sources of hydro-acoustic emissions produced by an intruder (e.g., diver, surface swimmer, UUV, etc.). The disclosed subject matter utilizes passive acoustics, where no sound energy is emitted, but, rather, only sound energy is detected. The disclosed subject matter uses acoustic detection, localization, and classification techniques, through disclosed signal processing techniques to greatly simplify the structure and increase effectiveness and capabilities of such underwater detection systems.

In an embodiment, the disclosed subject matter can meet the US Navy's Integrated Swimmer Detection Program requirements, which require that, in addition to being effective, it be portable, i.e., compact and lightweight, both key to its purpose as a military and homeland security system. In particular, the US Navy requirements state that the system must be deployable by two people in a small boat, and be redeployable within one hour. The disclosed subject matter is compact (in an embodiment, it can vary in size from a few meters and up in diameter when deployed, 2 feet in diameter when transported), and lightweight (in an embodiment, its weight is measured in 10's of pounds).

The disclosed subject matter relates to an underwater acoustic detection system that utilizes four acoustic sensors, e.g., under-water hydrophones, in a very small area cluster. The whole system can include at least three clusters, although one or two will work in many environments of interest. The system can achieve results comparable to that of other techniques, which may require hundreds of sensors in an array or require a priori knowledge of the detection area of interest and/or more or less permanent positioning of the detecting sensors. None of these are requirements of the disclosed subject matter.

The disclosed subject matter has enhanced detection capabilities as a result of performing preliminary analysis of the acoustic characterization of what a potential target may be doing or using, etc., e.g., an underwater breathing apparatus, such as SCUBA gear. The system may detect the acoustic signature of any other threat(s), as an example, an unmanned underwater vehicle ("UUV") or diver propulsion vehicle ("DPV"), employing, e.g., empirically gathered data, acoustic signal analysis, or analytic modeling etc. Experiments have been conducted to determine acoustical detection characteristics and requirements, e.g., within a real, complex, urban estuarine environment which cannot be adequately modeled by analytic or modeling methods alone. The results of such experiments have contributed to the signal analysis techniques used in the claimed subject matter and demonstrated the effectiveness of the claimed subject matter.

The claimed subject matter will, in part, be explained in regard to a possible use for the methods and apparatus of the claimed subject matter, such as, detection of and identification of an underwater intruder in the form of a diver utilizing a currently available SCUBA underwater breathing apparatus. SCUBA emits wideband acoustic signals with spectra that extends from low frequencies to 100 kHz and above. Furthermore, peak energies range vary widely among SCUBA types, hence detection methods must be agnostic to SCUBA types. In addition, the SCUBA signal has very low time domain sample-to-sample correlation, meaning that the correlation function of the acoustic signal will be very peaked. These characteristics can be key to the high performance operation of the system. "High performance" means long detection distances, and low probability of false detection.

Accordingly, the disclosed subject matter can take advantage of the characteristic peakedness of the cross-correlation function of the SCUBA signal, according to aspects of an embodiment of the disclosed subject matter, on received signals, received by a hydrophone cluster, along with more or less unique time-domain characteristics, in order to produce enhanced real time detection, characterization, directionality, and localization outputs.

The presently disclosed subject matter also can enable separation of multiple targets on the basis of the bearing angle between sensor and target.

Further time domain and spectral analysis can enable target characterization and discrimination, such as whether the target is a human, a marine mammal, a boat, or something else, and for a plurality of targets, which one is located where and moving in which direction.

The disclosed subject matter also can utilize a high accuracy sensor position system (SPS) to determine the precise position of the individual hydrophones in the cluster of hydrophones. The disclosed subject matter, therefore, does not require precise placement of the sensors vis-a-vis the particular environment or each other, as other detection systems do. This is critical to the rapid and accurate placement of sensors in marine environments, where precise a priori placement is extremely difficult. The SPS system may also measure sensor sensitivity for changes over time that will occur due to movement of sensors due, e.g. to currents, or embedding in the water bottom, or fouling by marine substances or underwater life forms.

The system, when deployed in multiple clusters, e.g., in a three cluster arrangement, can provide even more accurate 360 degree "target location" determination, as well as detection, direction, and characterization, (i.e., a determination of the type of target).

DETAILED DESCRIPTION

Figure 1:
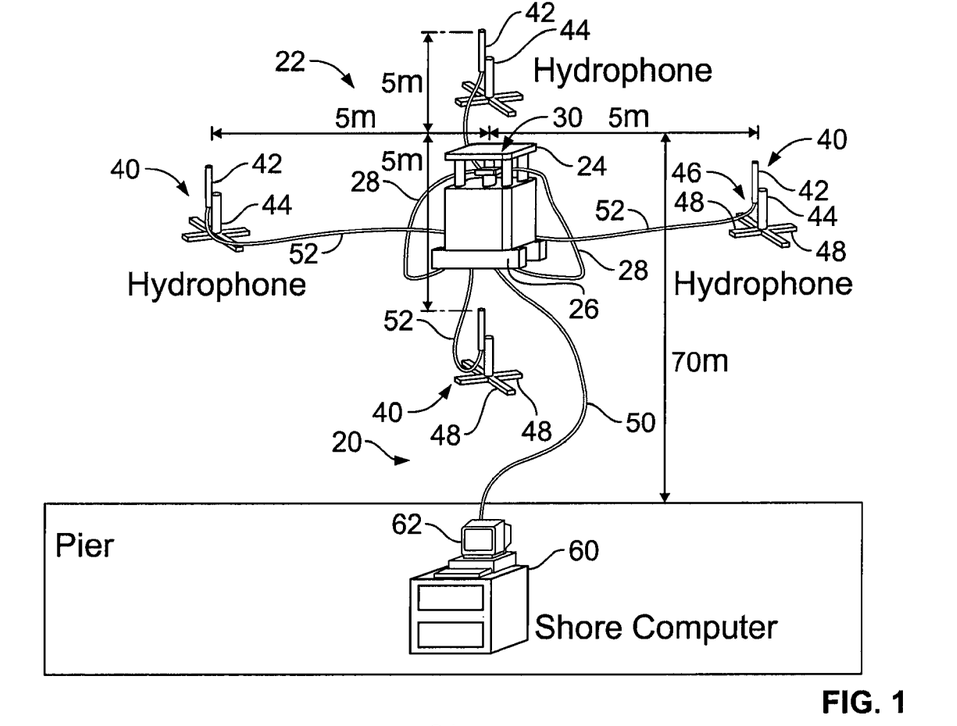
FIG. 1 shows a partly schematic perspective view of a detection system in accordance with aspects of an embodiment of the disclosed subject matter.

Turning now to FIG. 1, the underwater passive acoustic threat detection system 20 according to aspects of embodiments of the disclosed subject matter may include a cluster 22 of sensors. The cluster 22 may include a center pod 24, which may be bottom mounted using a bottom mooring which may include a weight, such as a cement block 26 and means for detaching the center pod 24 from the bottom mooring, such as explosive bolts (not shown). The center pod 24 may be kept upright on the bottom by a plurality of support brackets 28 extending outwardly from the center pod 24. The center pod 24 may contain a portion of the system 20, such as the data acquisition system 30, shown schematically in FIG. 2.

Figure 2:
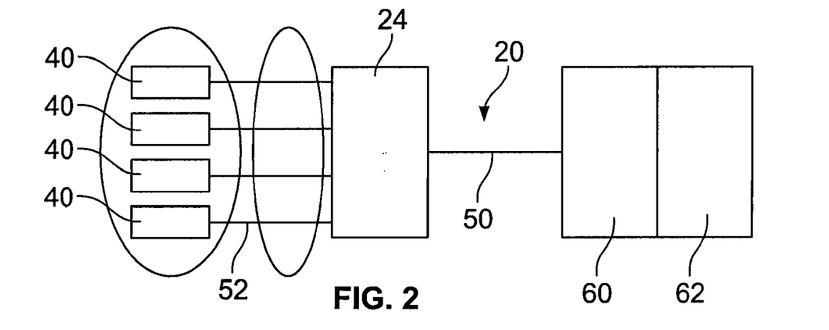
FIG. 2 shows schematically and in block diagram form the system shown in FIG. 1.
Figure 4:
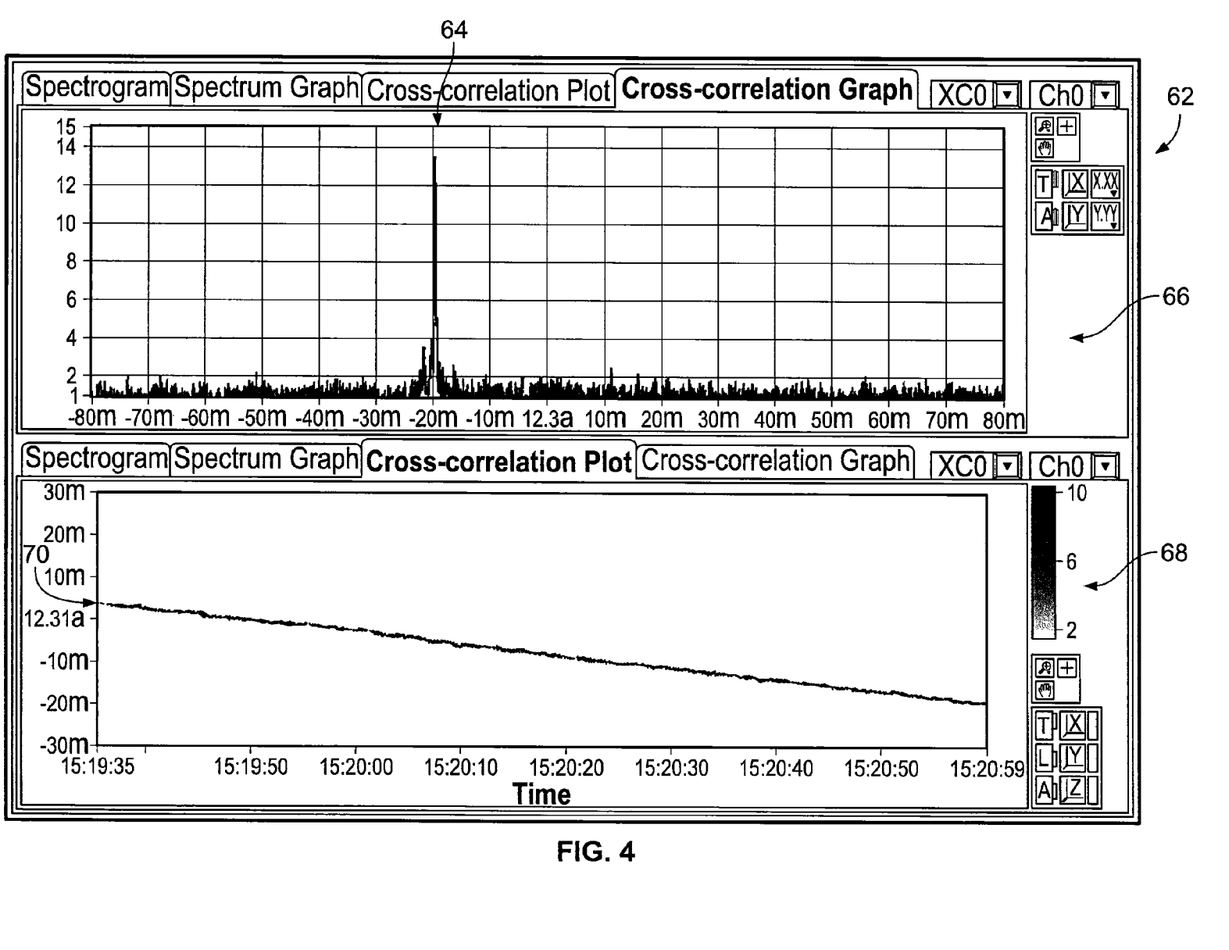
FIG. 4 in the upper panel shows a correlation function between signals coming to two hydrophones (cross-correlaton graph) displaying a cross-correlation time difference used in aspects of embodiments of the disclosed subject matter, and in the lower panel shows a cross-correlogram depicting the path bearing of a target as a function of time, according to aspects of an embodiment of the disclosed subject matter.

Data may be acquired by a plurality of, e.g., four hydrophones 40, shown as part of the sensor cluster 22, in generally a rectangular configuration around the center pod 24. Acquired data can be transmitted over a cable 50 from the center pod 24 to a dry-land (or boat-carried) computing device, which may form a portion of the data processing station 60 ("shore computer" 60 in FIG. 1). Some portion or all of the signal and data processing needed to determine required outputs of the system 20, such as the display 62, e.g., is also shown in FIG. 4.

The underwater acoustic hydrophones 40 may be include a hydrophone housing 42, which may be attached to a hydrophone stanchion 44, which may be mounted on a hydrophone stanchion base 46, e.g. formed of two crossed base legs 48. The base legs 48 and stanchion 44 provide a hydrophone 44 placement at a height of about 60 cm above the bottom surface of the body of water in which the hydrophone 40 is placed. The underwater acoustic hydrophones 40 may be electrically connected to and in signal communication with the center pod 24 through suitable connection, which may be borne within a cable 52. The cable 52 may be a plurality of cables contained within a single protective and water proofing outer sleeve.

Using the knowledge of sensor placement, every point in the lag domain of cross-correlation can be mapped to a particular true geographical bearing towards the target for every pair of acoustic sensors for which the cross-correlation is computed. One pair of sensors provides two possible bearings based on a single value of lag: one is a true bearing; the other one is mirrored across the line connecting the two hydrophones, as illustrated in FIG. 5. at 62a1 and 62a2.

Figure 5:
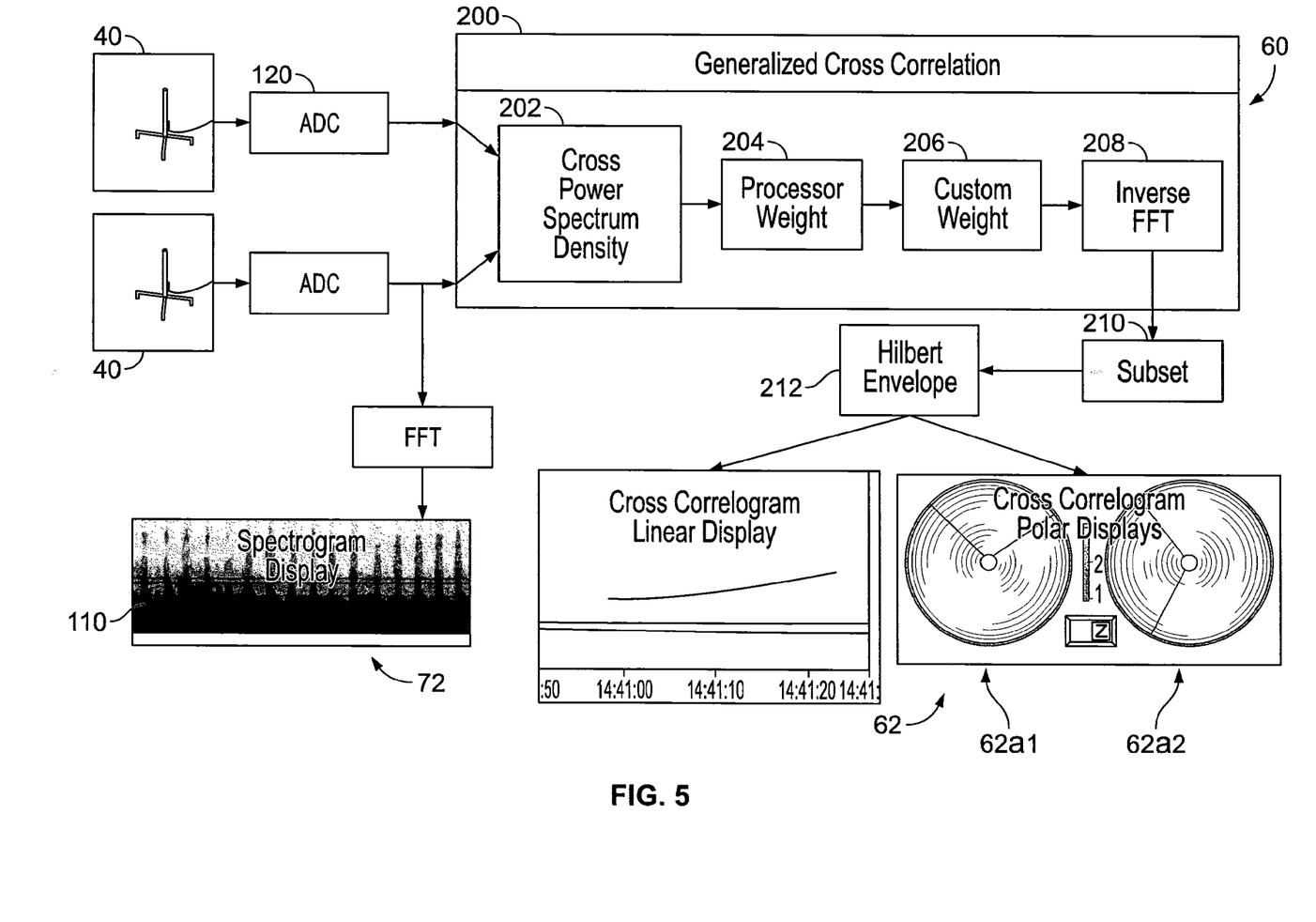
FIG. 5 shows schematically and in block diagram form signal processing employed in aspects of embodiments of the disclosed subject matter.
Figure 9:
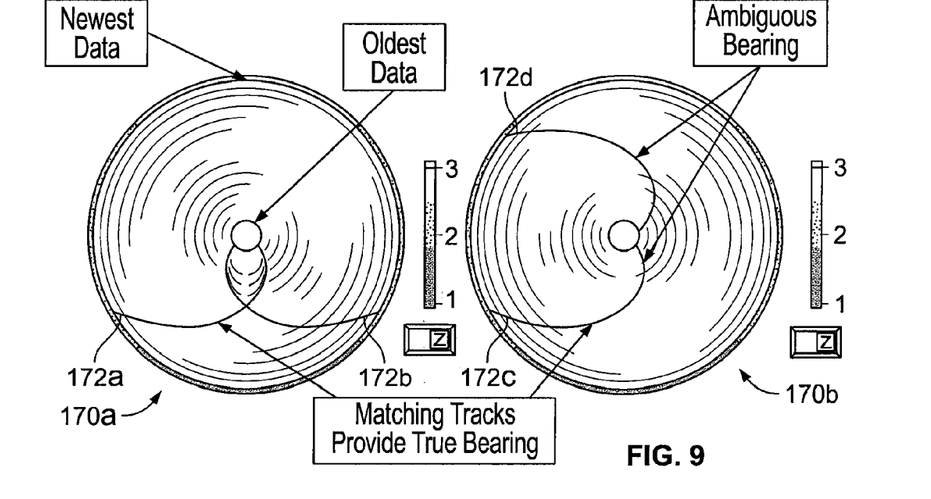
FIG. 9 is an illustration of a pair of polar displays.

In an embodiment, the user is presented with two polar cross-correlation plots, e.g., 62a1 and 62a2 in FIG. 5 or 170a and 170b in FIG. 9 corresponding to two pairs of sensors. By deploying the sensor pairs at different orientations, say at 90 degrees to each other, the true angle of bearing can be determined. In an embodiment, an automated tracker function can find the targets and eliminate ambiguous bearings. By calculating all possible combinations of cross-correlation pairs (six in this example), the system can provide 360 degrees of coverage for bearing estimation with approximately uniform resolution. In some applications the site geography, for example a shore line, can remove any ambiguity in target location. In the general case, multiple clusters 22, deployed at separated sites, can be used to provide triangulation positioning by intersecting lines of bearing with known origins, and thus provide range and bearing, i.e. location to a given target with high accuracy in all directions.

FIG. 2 shows a schematic block diagram of an underwater acoustic intruder detection system 20, which may include the multiple acoustic sensors, such as hydrophones 40, deployed in a cluster 22 in the water. According to aspects of an embodiment of the disclosed subject matter, the hydrophones 40 may be deployed in a pattern of a convex polygon, such as a quadrilateral, such as a square, when the plurality of hydrophones 40 is four hydrophones 40. The hydrophones 40 may be connected through power/communication cables 52 to a center pod 24, which is also deployed in the water.

The central pod 40 may be connected through a communication link, such as the cable 50, to the central data processing station 60 based on land, the central data processing station 60, which may, in turn, be in data communication with one or more displays 62. The center pod 24 can contain electrical connections and electronic circuitry, including perhaps data processing logic or circuitry, necessary to collect signals received by acoustic sensor hydrophones 40 and the means to transmit data to the central data processing station 60.

In an embodiment, by way of example only, the acoustic sensor hydrophones 40 can be connected to the center pod 24 via analog signal cables 52. In an embodiment, the hydrophones 40 may be deployed in a rectangular configuration, spaced apart by approximately 90° around the center pod 24, when there are four hydrophones 40. In an embodiment, the hydrophones 40 may be deployed at a relatively short distance, e.g., of approximately five (5) meters from the centerline axis of the center pod 24. In an embodiment, the hydrophones 40 may be International Transducer Corporation's model ITC-6050C hydrophones. They are sensitive in the band of up to 100 kHz and provide −157 dB re 1V/1 µPa midband open circuit receiving response.

In an embodiment, as shown in FIGS. 1 and 2, the center pod 24 may contain a signal conditioner, an analog-to-digital converter, and a computing device with means to acquire the data from the hydrophones 40, and when it is analog data, convert it into digital data. The center pod 24 may also do some other data processing, such as encoding, formatting, packetizing or the like and transmit it via the communications link cable 50 to the central data processing station 60, shown in FIG. 2. In another embodiment, the acoustic sensor hydrophones 40 can each contain a hydrophone transducer (not shown), a signal conditioner (not shown), an analog-to-digital converter (not shown), and means for digital communications via the cables 50 to the center pod 24, eliminating the need for some or all of these elements in the center pod 24.

In an embodiment, the communication link between the hydrophones 40 and the center pod 24 may be either wired, e.g., through the respective cable 50, or wireless, in which event, the wired communication line housed in the cable 50 may be eliminated. In an embodiment, the communication link when within the cable 50 may be comprised of copper wires or fiber optics, etc. A power connection providing power from the dry land (or a boat) to the center pod 24 may be included within the cable 50, and for distribution to the hydrophones 40 through the cable 52. Alternatively the center pod 24 may include a battery or other power source for the hydrophones 40 and other equipment located in the center pod 24.

In an embodiment, the communication link from the center pod 24 to the central data processing station 60 may be wireless. The center pod 24 may then contain a wireless communication device (not shown) such as a radio transmitter for communication from the center pod 24 to the central data processing station 60 or a radio transceiver, for data communication to and from the central data processing station 60. The transmitter/transceiver may be floated on the water surface, such as, by being placed in or on a buoy (not shown) tethered to the center pod 24. In an embodiment, the central data processing station 60 can include a radio transceiver for wireless communication directly with the elements of the system 10 deployed in the water, other than the center pod 24, i.e., directly to the hydrophones 44, in which event each would have a buoy or the cluster 22 would have a buoy.

In an embodiment, a computing device (not shown) in the center pod 24 can perform data pre-processing and data compression or other functions, as noted above, before transmitting the data to the central data processing station 60. The central data processing station 60 can, therefore, receive directly digital representations of signals acquired by the acoustic sensor hydrophones 40 and collected by the center pod 24 via the communications links between the hydrophones 40 and the center pod 24, wired or wireless. The central data processing station 60 can then process the data relating to the vibrations due to acoustic emissions sensed by the hydrophones 40 and produce appropriate displays on the one or more displays units 62.

In an embodiment, the acoustic sensor hydrophones 40, shown in FIGS. 1 and 2, can be positioned freely around the center pod 24, though generally in the configuration noted above. For proper operation of bearing determination, an accurate measurement of the positioning of the hydrophones 40 vis-a-vis adjacent hydrophones 40 is needed. Because of the large spacing between the hydrophones 40 (ten of meters or more), mounting them on a frame is not considered practicable and accurate placement of the hydrophones 40, and measurement of the placements, vis-a-vis each other must be taken into account.

For example, due to the action of waves and currents, as the hydrophones 40 and center pod 24 are deployed, e.g., dropped to the bottom, it can alter the positioning of the hydrophones 40 from an ideal desired positioning, vis-a-vis each other. Also the hydrophones 40 could be subsequently moved, such as also by the action of tides or currents, in effect distorting the measurements. For these reasons and for finding geographical coordinates of the cluster 22, an acoustical positioning of the hydrophones 40 can be required. Such positional relationships may be determined, e.g., by an acoustic calibration procedure according to aspects of an embodiment of the disclosed subject matter. In an embodiment, such an acoustic calibration procedure can consist of processing the signals received while towing a source of broadband acoustic emission around the deployment site of the cluster 22 of hydrophones 40 in the system 20, e.g., initially after the setup. In doing so, one can position the source remotely from the cluster 22 of hydrophones 40 at a wide variety of bearings, and preferably at all possible bearings, e.g., by making at least one closed loop transit around the cluster 22 of acoustic sensor hydrophones 40. By using cross-correlation, e.g., on each pair of the acoustical sensor hydrophones 40, the time difference between the arrivals of the acoustic emission, based on the output signals from the respective transducers in the hydrophones 40 can be determined. In an embodiment, the acoustic source can have a GPS receiver, so the position of the source with time is known at any given moment in time and this data can be transmitted to the central data processing station 60, where it can be used for calculating a true geographical bearing estimation and the geographical position of the acoustical sensor hydrophones 40.

Since all possible bearings are covered by the procedure, the signal has to travel the maximum possible distance along the line connecting any two sensor hydrophones 40 at least once, and the delay (lag) will be proportional to the distance between the hydrophones 40. This delay is used for finding of distance between the hydrophones. To determine the relative positions of the hydrophones 40, a polygon is constructed, with the vertices being the acoustic sensor hydrophones 40 and edges being the distances between the pairs, so all the angles of intersection can be computed.

From the collection of this data during a source transit around the cluster 22, each pair of hydrophones 40 can be positioned vis-a-vis its partner in the pair, including hydrophones 40 on the diagonals of the cluster. In an embodiment, the acoustic source has a GPS receiver, so the position of the source can be known at any given moment in time and the data is transmitted to the station 60 and can be used for true geographical bearing estimation and the geographical position of the acoustical sensor hydrophones 40, vis-a-vis each other.

A similar technique can be employed to position the center pod 24 vis-a-vis each hydrophone 40, e.g., by installing a hydrophone (not shown) on the center pod 24.

The system 20 can provide simultaneous acquisition and analysis of acoustical signals using four of the hydrophones 40. The analysis functions can include arbitrary digital filtering, spectral analysis and cross-correlation for simultaneous processing of signals from several hydrophones, acoustical source separation, and determination of bearing and range for different targets relative to the center of the cluster 22 or alternatively the center pod 24, where the center pod 24 is geographically positioned, as discussed above. The system 20 also records and stores the complete raw acoustical data set, enabling further research and analysis of the acoustic signals.

Figure 3:
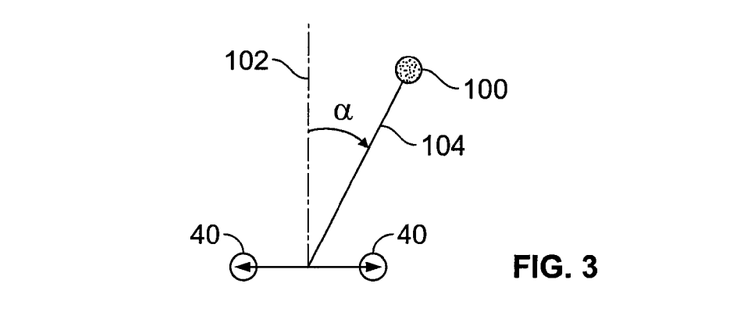
FIG. 3 is an illustration of a target bearing finding based on cross-correlation methods useful in aspects of embodiments of the disclosed subject matter.

Turning now to FIG. 3, there is illustrated a method for acoustic source detection and bearing determination, e.g., that is based on the calculation of the cross-correlation of acoustic signals recorded by one or more of the various pairs of hydrophones 40. Measurements of cross-correlation can be used for estimation of bearing to a source of acoustic emission. An electrical signal may be generated by each of two hydrophones 40 separated by a distance L as the result of the detection of an acoustic emission into the water by the hydrophone 40 transducers of each of the paired hydrophones 40. The two hydrophones 40 along with associated signal processing and transmission equipment, noted in this application, can be used to record the acoustic emissions radiated by a source 100 whose direction makes an angle α with the normal 102 to the line L between the hydrophones 40, as illustrated in FIG. 3. The distance 104 between the source 100 and the hydrophones 40 may be much larger than the hydrophone 40 separation distance L. The acoustic emission radiated from the source 100 reaches the two hydrophones 40 with a delay ΔT between them, where:

$$\Delta T = (L \sin \alpha)/c \quad (1)$$

c being the speed of sound in the water environment of the location of the system 20.

Assuming a single source 100 produces the acoustic field (acoustic emission in the water) the signals $h_1(t)$ and $h_2(t)$ recorded by the two hydrophones are, therefore, delayed versions of the same signal. Then:

$$h_2(t) = h_1(t - \Delta T) \quad (2)$$

with ΔT equal to the delay in equation (1).

The cross-correlation $R_{12}(\tau)$ of the signals $h_1(t)$ and $h_2(t)$ can be defined as:

$$R_{12}(\tau) = \int_{-\infty}^{\infty} h_1(t') h_2(\tau - t') dt' \quad (3)$$

For two delayed signals of the form (2):

$$R_{12}(\tau) = R_{11}(\tau - \Delta T) \quad (4)$$

The cross-correlation $R_{12}(\tau)$ of the signals from the two hydrophones 40 is the same as the autocorrelation $R_{11}(\tau)$ of the signal from one of the hydrophones 40 but shifted to the time ΔT. Because the autocorrelation of a signal is maximum at 0=t, the cross-correlation $R_{12}(\tau)$ is maximum at ΔT=t. Therefore, the time location of the maximum of the cross-correlation can be used to estimate the direction to the source 100. The cross-correlation method can be generalized to include pre-filtering or frequency weighting, etc. Since cross-correlation can be written as the inverse Fourier transform of cross spectrum power spectral density $$R_{12}(\tau) = \int_{-\infty}^{\infty} G_{12}(f) e^{j2\pi f \tau} df, \quad (5)$$

where $G_{12}(f)$ is the cross spectrum power density. If the signals are pre-filtered, then the cross-correlation can be written as:

$$R'_{12}(\tau) = \int_{-\infty}^{\infty} \psi_g(f) G_{12}(f) e^{j2\pi f \tau} df, \quad (6)$$

where:

$$\psi_g(f) = H_1(f) H_2^*(f) \quad (6b)$$

is the general frequency weighting, with $H_1(f)$ and $H_2(f)$ being the response of filters applied to the input signals. Using fast Fourier Transforms ("FFTs") the cross-correlation can be computed efficiently and the weighting can be added to the signals after computing the cross spectrum by simple multiplication. applicants have found that Phase Transform ("PHAT") is efficient when combined with additional filtering to selectively attenuate narrow-band interference or highlight signal $$\psi_g(f) = H_c(f)/|G_{12}(f)|. \quad (7)$$

A filtering function Hc(f) can be chosen by the system 20 operator to emphasize the target signal and to suppress interfering signals.

The system 20 display 62 shows the cross-correlogram 64 of the signal for any hydrophone 40 pair and in the form of a floating chart representing the cross-correlation 64 as a function of time, such as is shown in the top panel of FIG. 4. The time variations of the cross-correlation function are presented in the form of a floated chart 68 similar to a spectrogram, a graph with two geometric dimensions: the horizontal axis representing time, the vertical axis representing the delay between two hydrophone 40 signals; a third dimension indicates the amplitude of the cross-correlation function, which can be displayed as variation in color (not shown in FIG. 4). A snapshot of the system 20 cross correlation display 62 is presented in FIG. 4, showing a display 66 of a cross-correlogram of the signal for a pair of hydrophone 40 and the same cross-correlogram in a color map form, with the time dimension 68, respectively in the top and bottom panels of FIG. 4.

The time delays in the cross correlation function can be recalculated to the source bearing angle using the Eq. (1).

$$\alpha_1 = \arcsin(c\Delta T/L) \quad (8a)$$

$$\alpha_2 = \pi - \arcsin(c\Delta T/L) \quad (8b)$$

It can be seen that the same time delay ΔT takes place for two possible angles which produces ambiguities in the process of the source 100 bearing measurement by a single pair of hydrophones 40. This ambiguity can be solved using signal processing of several cross-correlation signals, i.e., from differing pairs of hydrophones 40, as is explained in more detail below.

The schema of signal processing according to aspects of an embodiment of the disclosed subject matter is illustrated schematically and in block diagram form in FIG. 5. The system 20 can have a graphical user interface that can provides several displays 62, including two polar intensity displays 62a1 and 62a2, wherein each shows two possible lines of bearing relative to the center of the cluster 22 of to the center pod 24, which together can provide a unique bearing. The displays 62 can also include a display 68, which is a correlogram of the processed data, such as is also shown in the bottom panel of FIG. 4, and also display 72, which is a spectrogram 110 of an individual hydrophone 40 output. These displays can allow for monitoring of the hydro-acoustic signals received from the hydrophones 40 and for estimation of a bearing towards any one of a possible multiple number of simultaneous targets (sources 100).

Turning now to FIG. 5, electrical signals coming from the hydrophones 40 can be pre-amplified, e.g., within the hydrophone 40 itself, in a pre-amplifier (not shown) and transferred as a digital signal output of analog-to-digital converters 120, e.g., using a National Instrument Data Acquisition system. Every channel communicating data from a respective hydrophone 40 to the central data processing station 60 can be sampled, e.g., at 200 kHz, allowing analysis of acoustical signals in a wide frequency band up 100 kHz. FIG. 5 is discussed in more detail below.

Figure 6:
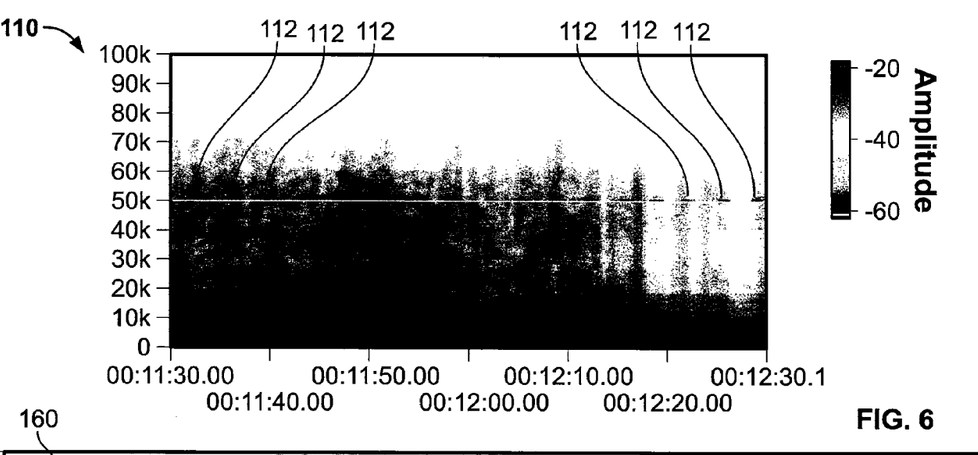
FIG. 6 shows a spectrogram according to aspects of embodiments of the disclosed subject matter.

The spectra of the received signals can be displayed in the form of a spectrogram 110 that allows visual observation of the time varying frequency content of the signals, such as, is illustrated in FIG. 6. The x axis of the spectrogram 110 chart is time, and is updated continuously, in time, although the peaks seen were about two minutes apart or so. That is because that is how the diver was breathing. Hence, the peaks are a function of the signal in the water, which in this case are two minutes apart, and are being recorded by the continuously evolving spectrogram, with the earlier times moving to the left of the spectrogram 110 as newer signal inputs appear at the right of the spectrogram 110. As shown the spectrogram 110 is evidencing the receipt of very broad band acoustic emission, e.g., from a passing boat, which has a high amplitude, evidenced by the darker color (shade of grey in the FIG. 6) and which fades in amplitude at about time 00:12:18:00, as shown on the x-axis of the spectrogram 110. The spectrogram 110 also shows a more or less periodically repeating signal across the spectrogram 110 at about 50 kHz (shown by the darker dashes 112, which is more visible in the spectrogram 110 of FIG. 6 after the high amplitude emission fades toward the right-hand end of the time varying spectrogram 110). This may be due to a SONAR system operating in the vicinity of the hydrophones 40.

It is also possible to identify sources of acoustic interference, such as active sonar systems and depth-sounders, and the frequency band of the interfering noise, allowing for activation of appropriate filtering in the next step of the signal processing.

The cross-correlation can be computed using a frequency domain Fast Fourier Transform algorithm by first taking the cross spectrum power density (block 202 in FIG. 5) and then on a computing device weighting the signals (block 204). An additional custom weight can be added which can be used to account for the relative spectral properties of sound emissions from various sources (block 206). The system 20 operator can choose the frequency band(s) and thus provide for, e.g., better detection and separation of various targets with different spectral content. Removal of the low frequencies can, e.g., reduce the interference due to ships (whose major acoustic emission comes from a relatively slow RPM propeller). Filtering can also allow the isolation of acoustic emissions in different frequency bands, e.g. SCUBA divers, Unmanned Underwater Vehicles, Diver Propulsion Vehicles, and surface swimmers.

Finally, as the distance between the hydrophones 40 imposes a maximum possible delay between signals, only the information associated with the possible subset of delays need be kept. As a result, a peak at a delay related to its direction is associated with every broadband source 100 (e.g., a diver or a ship or a small motor boat). If the frequency content is uneven, cross-correlation peaks get modulated by high frequency. The representation of the correlation can be improved by computing its envelope using the analytic signal associated with the cross-correlation. This operation can be made at little cost by including it into the computation of cross-correlation.

Figure 7:
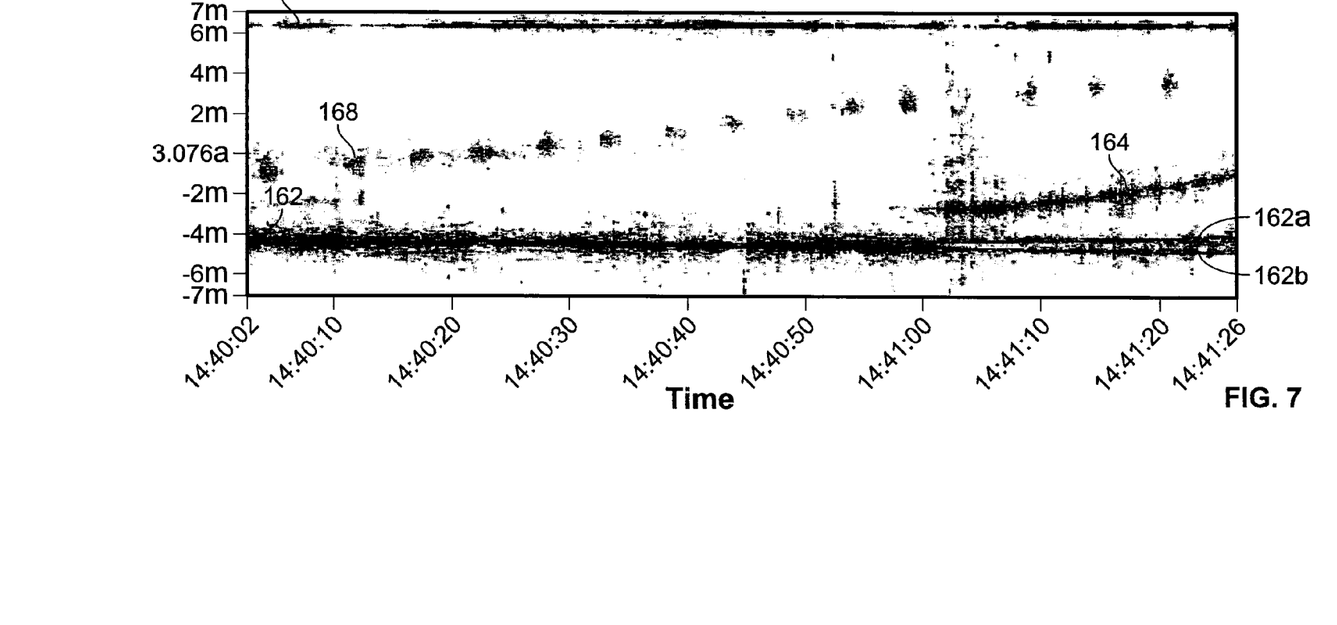
FIG. 7 shows a cross-correlogram according to aspects of embodiments of the disclosed subject matter showing separation of paths of different targets.

As the analytic signal is obtained by removing the negative frequencies of the signal, these frequencies can be removed during the cross-correlation computation while in the frequency domain, such as, during the generalized cross-correlation determination process 200 shown in FIG. 5. The absolute value of the obtained complex cross-correlation is then taken to obtain the envelope. For each considered pair of hydrophones 40, the cross-correlation processing 200 can result in an image 150, such as is shown in FIG. 7. The image 150 is dominated as a cross-correlogram. Such cross-correlogram image 150 can be used for visual inspection, be combined, or serve as a basis of further analysis.

FIG. 7 shows an example of a recorded cross-correlogram image 150. The cross-correlogram image 150 shows the signals from three vessels and a diver. Only one moving vessel is visible evidenced on the cross-correlogram image 150. Two of the vessels are indicated to not be moving, or moving with respect to the cluster 22 of hydrophones 40 with a very slowly changing α (FIG. 3). This could be because the target is at a relatively great range away or at a bearing that naturally would tend to vary little, such as in a river environment where in a straight run of the river some targets will be coming toward the sensor cluster 22 or moving away from the sensor cluster 22 with a relatively constant bearing. This is indicated for track 160 at a ΔT of about 6.3 milliseconds and for track 162 at a ΔT of about −4.3 milliseconds, which turns out to be two tracks 162a and 162b as indicated in the more recent time period of the correlogram 150 of FIG. 7. Also shown on the correlogram 150 of FIG. 7 is another track 164 indicating another apparent boat target, which is changing bearing relatively quickly, i.e., from a ΔT of about −2.8 milliseconds to about −1 milliseconds.

The correlogram 150 of FIG. 7 also shows a periodically appearing signal 168 occurring at intervals of about every 6-8 seconds, over a relatively long period of time, i.e., about one and one-half minutes. This is the SCUBA signal, and is clearly distinct from the boat signals. The system 20, according to aspects of an embodiment of the disclosed subject matter, is also based on frequency analysis, wherein the SCUBA signal is found to be a wideband signal extending from low frequencies upwards to approximately 100 kHz. This can be interpreted as the acoustic emission coming from the underwater breathing apparatus, such as a SCUBA diver's breathing regulator, which emits sound vibrations due to the rush of compressed air from the SCUBA air tank through the regulator each time the diver inhales, resulting in wideband frequency vibrations. The detected diver acoustic emission signal and detected boat acoustic emission signal are clearly separated, making detection and characterization much more reliable.

Figure 8:
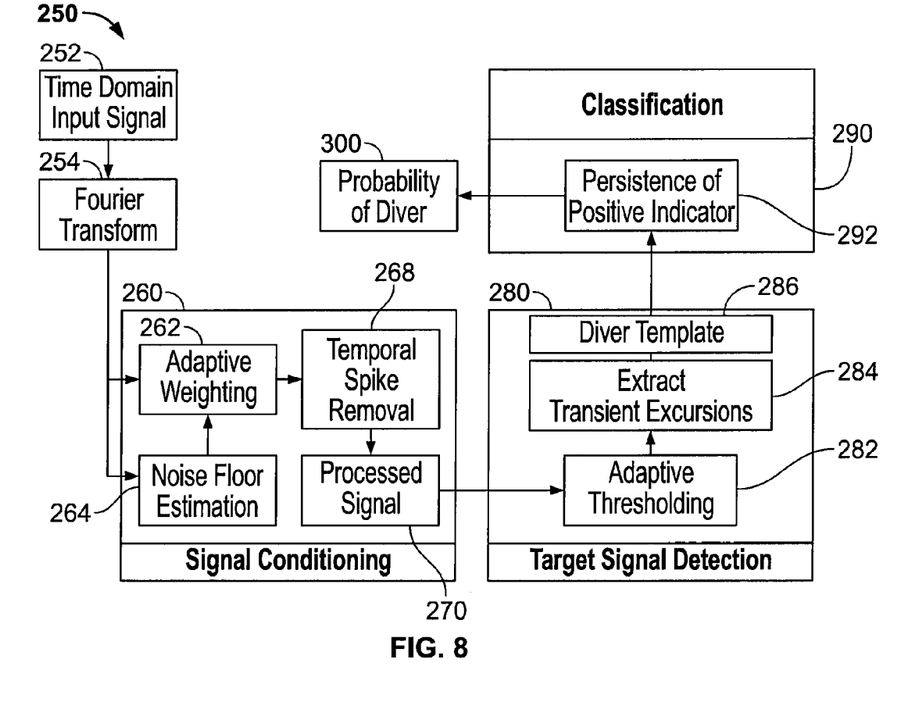
FIG. 8 shows schematically and in block diagram form signal processing utilized according to aspects of embodiments of the disclosed subject matter.

Turning Now to FIG. 8, a schematic block diagram view of a signal processing arrangement 250 is illustrated according to aspects of an embodiment of the disclosed subject matter. A time domain input signal is input at block 252, which can be in digital form and is the result of the pickup from one or more of the hydrophones 40 in a given cluster 22 and whatever preprocessing and signal conditioning may have preceded the input of the time domain input signal at block 252, such as, in the hydrophones 40 themselves, in the electronics in the center pod 24 or in upstream processing portions of the central data processing station, 60, of which the signal processing arrangement 250 of FIG. 8 may be a part. In block 254, the time domain signal is subjected to a Fourier transform, such as a discrete Fourier transform ("DFT") or a fast Fourier transform ("FFT"), where speed and conservation of computing power and memory dictates, in order to convert the input signal into a representation in the frequency domain.

The signal is then input into a signal conditioning unit 260, where, in block 264, it is subjected to a noise floor estimation, such as, by ambient environmental background noise and location specific characteristics, such as may be due for example to a water treatment plant, in order to reshape the ambient spectrum to reduce the effects of such factors, and to provide a more reliable detection capability. The input signal in block 262 is also provided to an adaptive weighting process which also utilizes the output of the noise floor estimation in block 264, such as, by variations over time of external acoustic influences. The signal is then further processed in block 268 by analyzing external time domain (temporal) factors, such as existing ambient sonar systems or sounds made by marine life, in order to suppress these and remove them as possible interferences in the detection process.

Thereafter, the signal is input into a target signal detection unit 280, where, in block 282, the signal is subjected to adaptive thresholding, by determining when a received signal, which may be a target, exceeds the background noise floor by a predetermined amount. Since the noise floor and received signal level can vary, for example, as the target gets closer or farther from the sensors, this can be done adaptively. In block 284 transient excursions, such as, acoustic signals generated by a SCUBA diver breathing are extracted, such as, by envelope detection mechanisms, as illustrated and discussed in more detail with respect to FIG. 10 in order to determine whether the received signal which exceeds the noise floor by a predetermined amount represents a target of interest. The signal is then passed through a diver template, wherein, as an example, the characteristics of the signal are examined for the existence of properties which could indicate the signal represents a diver, such as the frequency of the signal, a relatively short duration of the signal and repetitive nature of the signal with a period that could represent breathing, such as with a SCUBA breathing regulator being used, and for the non-existence of properties which could indicate the signal does not represent a diver, such as the frequency of the signal, a relatively long duration of the signal, i.e., non-periodic nature of the signal, etc. Provided the signal characteristics are consistent with the signal being a diver, i.e., the signal successfully passes through the diver template in block 286, the system 250 then examines the signal to see if it persists for some threshold period of time in block 292 in a classification unit 290, and if so, then some sort of indication, such as an intruder alarm, is initiated in block 300, because the system has detected the probability that there is a diver and that the diver is persisting to remain in the area of a cluster 22.

Turning now to FIG. 9 there is illustrated a pair of polar intensity displays 170a, 170b, which show respective cross-correlation intensity plots 172a, 172b on intensity display 170a and 172c, 172d, on intensity display 170b, mapped to an estimated bearing derived from signals from two different pairs of hydrophones 44. The amplitude of the cross-correlation function can be displayed using color, while its angle can be recalculated over time, e.g., from the time delays using Eq. (8a) and Eq. (8b). The most recent data appears at the perimeter of the polar intensity displays 170a, 170b and moves towards the center with time. The tracks 172a and 172c overlapping each other remove the ambiguity in bearing, by each pair of hydrophones 40 of the two different pairs, the signals from which are displayed on the intensity displays 170a, 170c, indicating the true bearing track.

In an embodiment, the polar cross-correlation history plot displays 170a, 170b illustrated in FIG. 9 can include concentric curves, colored according to a color map representing the power of cross-correlation, with the angle of every point on the circle directly corresponding to its true bearing angle derived from the time lag $\Delta T$ of arrival at different hydrophones 40. The radius of the circles can represent the actual time at which a specific cross-correlation sample was acquired, with the outer circle can representing the newest data and the older data moving towards the inner circle.

In an embodiment, the processing of the signals includes spectral analysis and generalized cross-correlation processing. The results of spectral analysis are displayed as spectrograms, one of which is illustrated by FIG. 6. Generalized cross-correlation processing of signals is provided for a full set of possible acoustic sensors pairs. as illustrated block 200 of FIG. 5. In an embodiment, in the case of four hydrophones 40, this would equal six pairs. Before cross-correlation processing, signals are pre-processed with a time-domain frequency filter bank and decimated. The result is displayed as cross-correlation history plot, as illustrated by the lower panel of FIG. 4 and FIG. 7. The results of cross-correlation processing are further analyzed with a tracking algorithm identifying the time lag of signal arrival at different hydrophones 40. This is done for persistent wideband acoustic sources using adaptive thresholding, non-peak suppression, to detect peaks in the cross-correlogram and tracking the ones which exist for some time.

Figure 10:
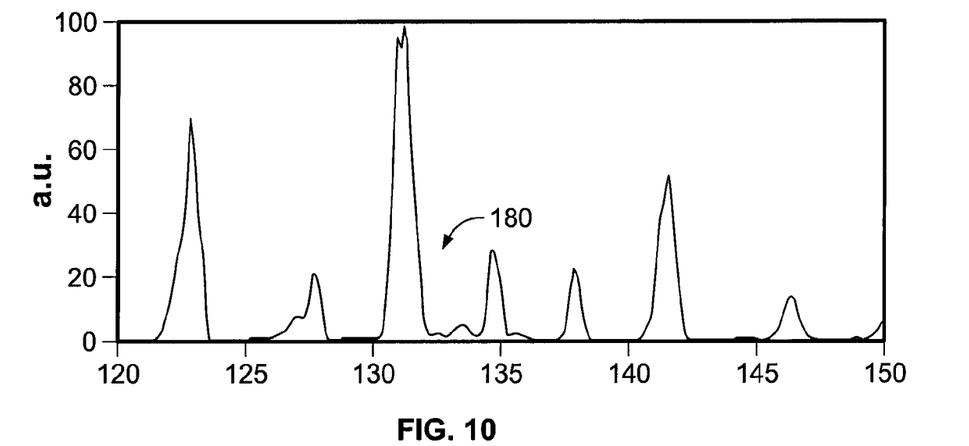
FIG. 10 shows a signal envelope of a SCUBA signal useful in embodiments of the disclosed subject matter.

Also developed is an automated diver detection aspect of the disclosed subject matter, e.g., based on detection of the breathing rate and spectrum of the diver. The proposed Diver Indicator ("DI") can be computed in a cumulative manner, e.g., from a previously computed envelope signal 180. The envelope signal 180, an example of which is illustrated in FIG. 10, may have a low sampling rate (e.g. between around 8 and 20 Hz) and can present high values during a certain phase(s) of the diver breathing and low values otherwise. The envelope signal 180 can be the is result of post processing of the data displayed in a cross-correlogram, such as cross-correlogram 150 in FIG. 7, which may be computed according to a method whereby the low frequency envelope of the wideband signal is tracked, presenting a square-like pattern, e.g., the pattern in FIG. 10, which as shown in FIG. 7, can correspond to acoustic emission indicating a diver(s) breathing.

The DI may be used to this square-like pattern 180, as shown in FIG. 10, and determines whether its rate is consistent with it indicating a diver(s) breathing. The first step may be to label the various samples of the envelope as low and high values, resulting in a binary signal. As the envelope 180 can come from various sources (i.e. different processing and/or different sensors), it is advisable to determine a threshold from the envelope 180 itself. A further advantage of this approach is that it allows coping with slow variation in the background noise. The duration between the switching of the binary signal can then be analyzed in order to assess whether it is consistent with a physiologically possible diver(s) breathing rate.

According to aspects of an embodiment of the disclosed subject matter, there may other be other presences in the water surrounding the system 20 of the present application, e.g., a UUV. The UUV may produce various types of acoustic emissions, that can be detected, recorded, e.g., in a spectrogram, and analyzed in the manner described above. These acoustic emissions may include, e.g., acoustic emissions from the motor and propeller, acoustic emission from an acoustic modem signal and acoustic emissions representing the UUV sonar. A suitable correlogram may be produced from the signals produced by the system 20 in response to these acoustic emissions, according to aspects of an embodiment of the disclosed subject matter, that can allow for identification that the target is a UUV and to produce bearing determinations relating to the UUV over time.

An analysis function can include arbitrary digital filtering, spectral analysis and cross-correlation for simultaneous processing of signals from several hydrophones 40, acoustical source separation and determination of bearing for different targets relative to the center of the cluster 22 or of the center pod 24. The system 20 also can record and store some or all of the raw acoustical data set, enabling further research and analysis of the acoustic signatures and the like.

Due to the low number of sensors and the compact deployment area, the disclosed subject matter can fill the need for a highly sensitive, low cost, automated and easily deployable (and retrievable) underwater intruder or threat detection system; such as is currently unavailable. The disclosed subject matter can be a valuable capability for detecting, characterizing, and localizing intruders and other threats in marine situations, and can provide low cost, low maintenance, low probability of error and increased interdiction time.

By replicating and deploying an additional installation of the four-hydrophone 40 cluster 22, as described above target position localization can be achieved in addition to bearing determination and target characterization. Acoustic emitters (transmitters) may be employed in conjunction with acoustic sensors (receivers), e.g., on the center pod 24 or on the hydrophones 40 or their mounts 44, whereby the system 20 can be capable of self-calibrating. The system 20 in such a configuration can self calibrate geographic location of the hydrophones 40 in the cluster 22, the center of the cluster 22, and the location of the hydrophones vis-a-vis each other and the center pod 22 and the geographic center of the cluster 22. Given a known location for the center pod 24, such as by placing a GPS unit on the center pod 24, or a previous geographic location calibration as noted above, the location of the hydrophones 40 in the cluster 22 geographically and vis-a-vis the center pod 24 may be determined using an active acoustic emitter, such as a small power SONAR unit on the center pod 24.

In addition, sensor variation, in addition to change in geographic and/or cluster 22 co-location, can be detected. Such changes could relate to responsiveness to acoustic emission (as an example due to environmentally related changes, such as barnacle growth, or electrical or electronic deterioration, such as due to deterioration of a water tight seal) or change in performance due to temperature or salinity of the environment, etc. can be periodically monitored.

By networking clusters 22 together via undersea cables, wide areas of surveillance can be achieved, such as various areas within a harbor or breakwater, or along a coastline, etc.

Further simplicity and new security applications can be achieved using underwater acoustic communications among sensors.

By distributed processing, communication requirements among clusters 22 and between clusters 22 and the need for base stations can be minimized. This enables surface radio stand-alone operations where bandwidth is limited, and elimination of some single points of failure in cabled and stand-alone operation. By utilizing distributed processing (e.g. to locally determine and transmit only alarm information), and various power saving modes (power-down mode or cycling On/Off operation) and powering options (batteries, solar panels) remotely deployed, long life stand-alone operations can be achieved.

By use of acoustic release, or galvanic release, exploding bolts or other means to detach the center pod 24 from its mooring and with the incorporation of self-activated buoyancy capability, stand-alone systems can be made to self-surface at required times or intervals for collection or maintenance.

By utilizing the inherent ability to track multiple sources unmanned underwater vehicles (UUVs) can be directed to close surveillance of suspected targets.

By equipping UUVs or other diver propulsion assistance vehicles or the like with an implementation of the system of the disclosed subject matter, navigation in denied or otherwise dangerous waters can be achieved using existing, local sound sources. That is, the reverse of the system 20 herein described can be made mobile, by incorporating it on to a craft, and then utilizing the acoustic emission detection and direction determination capabilities of the system 20 as described herein, along with, perhaps also target identification and discrimination capabilities as noted above, the system 20 can be used for underwater passive sound-based navigation. Known acoustic emission sources with known characteristics and known geographic location can be detected by a mobile implementation of the system 20 of the present application and be used for navigational beacons once bearing information is detected. Detection of several such known sound beacons can enable navigational triangulation to obtain geographic location of the system 20 as it moves in the underwater environment.

It will be understood by those skilled in the art that a passive, hydro-acoustic intruder detection system has been disclosed, such as for protecting high value naval and marine assets, as well as domestic maritime security applications. The system uses passive techniques, meaning no signals are emitted by the system, rather only passive listening is employed. The system uses a few, small, lightweight, and easily deployable hydrophone sensors together with a compact, lightweight moored data acquisition computer system. The acquired data is transmitted over a marine cable to a dry computer, on land or a boat, where advanced signal processing techniques are employed. These techniques include time-series analysis, spectral analysis, and cross-correlation of the acquired data, and enable displays to the system operator of the presence of intruders at long distances (1000 m), the location of the intruder in geophysical coordinates, and the characterization of the intruder in terms of whether it is a SCUBA diver, boat, unmanned underwater vehicle, or diver propulsion system, etc. It will be understood that the embodiments of the invention described herein are merely exemplary and that a person skilled in the art may make many variations and modifications without departing from the full spirit and the scope of the embodiment described herein. Accordingly, all such variations and modifications are intended to be included within the scope of the present invention.

We claim:

1. An intruder detection apparatus, comprising:
a plurality of acoustic emission sensors arranged in a cluster beneath the surface of a body of water, the cluster defining a first pair and a second pair of acoustic emission sensors within the cluster; and
a computing device configured to:
receive a first signal produced by one acoustic emission sensor within the first pair, the first signal being produced in response to said one acoustic emission sensor detecting a first acoustic emission generated by and emanating from a source, receive a second signal produced by another acoustic emission sensor within the first pair, the second signal being produced in response to said another acoustic emission sensor detecting the first acoustic emission generated by and emanating from the source, and receive at least a third signal produced by one acoustic emission sensor within the second pair, the third signal being produced in response to said one acoustic emission sensor within the second pair detecting a second acoustic emission generated by and emanating from the source;
determine a first cross-correlation factor between the first signal and the second signal, based on a time difference between the detection of the first acoustic emission by the acoustic emission detectors in the first pair;
determine a second cross-correlation factor relating to at least the third signal and another signal from another acoustic emission sensor of the second pair, based on a time difference between the detection of the second acoustic emission by the acoustic emission sensors of the second pair;
determine a bearing to the source based on at least one of the first cross correlation factor and the second cross correlation factor; and
determine a range to the source based on at least one of the first correlation factor and the second correlation factor.

2. The portable threat detection apparatus of claim 1, further comprising:
the computing device further configured to:
analyze one of the first signal and the second signal, together with at least one other signal received by an acoustic emission sensor within the cluster representative of the detecting of at least one other acoustic emission generated by and emanating from the source to determine if each of the one of the first signal and the second signal and the at least one other signal conform to a threat-type template.

3. The portable threat detection apparatus of claim 2, further comprising:
the computing device further configured to:
determine whether each of the one of the first signal and the second signal and the at least one other signal conforming to the threat-type template persists as to subsequent ones of the first signal and the second signal and at least one subsequent other signal, for some threshold period of time.

4. The apparatus of claim 1, further comprising:
the apparatus being deployed on the bottom of a body of water.

5. The apparatus of claim 4, further comprising:
the plurality of acoustic emission sensors each, comprising a hydrophone resting in a generally stationary position on the bottom of body of water.

6. The apparatus of claim 1, further comprising:
the plurality of acoustic emission sensors each comprising a hydrophone, wherein the hydrophones forming the cluster are tethered to each other.

7. The apparatus of claim 6, further comprising:
the hydrophones forming the cluster are tethered to each other through a center pod.

8. The apparatus of claim 1, wherein the first pair and the second pair share a common acoustic emission sensor.

9. The apparatus of claim 8, wherein the first acoustic emission and the second acoustic emission are the same acoustic emission.

10. The apparatus of claim 1 wherein the first acoustic emission and the second acoustic emission are the same acoustic emission.

11. The apparatus of claim 1, wherein the computing device is configured to:
determine a first bearing to the source based on the first cross correlation factor and a second bearing to the source based on the second cross correlation factor; and
determine a range to the source based on the intersection of the first bearing and the second bearing.

12. The apparatus of claim 1, wherein the at least a third signal produced by one acoustic emission sensor within the second pair, comprises a third signal produced by said one acoustic emission sensor in the second pair and a fourth signal being produced by another acoustic emission sensor in the second pair, neither of the one acoustic emission sensor or the another acoustic emission sensor in the second pair being shared with the first pair.

13. An intruder detection apparatus comprising:
a plurality of acoustic emission sensors arranged in a cluster, the cluster forming a polygon defining at least two axes of alignment between respective pairs of acoustic emission sensors within the cluster;
a computing device in cooperation with a non-transitory computer readable storage medium comprising computer readable instructions for performing via the computing device a method comprising:
receiving a first signal produced by a first acoustic emission sensor within a respective pair of acoustic emission sensors, in response to the first acoustic emission sensor detecting an acoustic emission from a source, and receiving a second signal produced by a second acoustic emission sensor within the respective pair of acoustic emission sensors, in response to the second acoustic emission sensor detecting the acoustic emission from the source;
determining a cross-correlation factor between the first signal and the second signal; and,
determining a bearing to the source based on the cross correlation factor;
the plurality of acoustic emission sensors each comprising a hydrophone,
the hydrophones forming the cluster are tethered to each other through a center pod;
the center pod comprising:
a buoyancy mechanism; and,
a bottom mooring mechanism; and,
a mechanism for releasing the center pod from the bottom mooring mechanism, whereby the center pod and the hydrophones are recoverable at a surface of a body of water on the bottom of which the center pod and hydrophones had been deployed.

14. A method for intruder detection comprising:
receiving, via a computing device, a first signal produced by one acoustic emission sensor within a first pair of acoustic emission sensors, in a cluster of a plurality of acoustic emission sensors, arranged beneath the surface of a body of water, the cluster defining the first pair and a second pair of acoustic emission sensors, the first signal being produced in response to said one acoustic emission sensor detecting a first acoustic emission generated by and emanating from a source, and receiving, via the computing device, a second signal produced by another acoustic emission sensor within the first pair, the second signal being produced in response to said another acoustic emission sensor detecting the first acoustic emission generated by and emanating from the source and receiving, via the computing device, at least a third signal produced by one acoustic emission sensor within the second pair in the cluster, the third signal being produced in response to said one acoustic emission sensor within the second pair detecting a second acoustic emission generated by and emanating from the source;

determining, via a computing device, a first cross-correlation factor between the first signal and the second signal, based on a time difference between the detection of the first acoustic emission by the acoustic emission detectors of the first pair;

determining, via a computing device, a second cross-correlation factor relating to at least the third signal and another signal from another acoustic emission sensor of the second pair, based on a time difference between the detection of the second acoustic emission by the acoustic emission sensors of the second pair;

determining, via a computing device, a bearing to the source based on at least one of the first cross correlation factor and the second cross correlation factor; and determining, via a computing device, a range to the source based on at least one of the first correlation factor and the second correlation factor.

15. The method of claim 14, further comprising:
analyzing, via a computing device, one of the first signal and the second signal, together with at least one other signal representative of the detecting of at least one other acoustic emission generated by and emanating from the source, to determine if the one of the first signal and the second signal and the at least one other signal conform to a threat-type template.

16. The method of claim 15, further comprising:
determining whether the conformance of the first signal and the second signal and the at least one other signal to the threat-type template persists as to subsequent ones of the first signal and the second signal and at least one other subsequent signal for some threshold period of time.

17. The method of claim 14, wherein the first pair and the second pair share a common acoustic emission sensor.

18. The method of claim 17, wherein the first acoustic emission and the second acoustic emission are the same acoustic emission.

19. The method of claim 14 wherein the first acoustic emission and the second acoustic emission are the same acoustic emission.

20. The method of claim 14, further comprising:
determining a first bearing to the source based on the first cross correlation factor and a second bearing to the source based on the second cross correlation factor; and
determining a range to the source based on the intersection of the first bearing and the second bearing.

21. The method of claim 14, wherein the at least a third signal produced by one acoustic emission sensor within the second pair, comprises a third signal produced by said one acoustic emission sensor in the second pair and a fourth signal being produced by another acoustic emission sensor in the second pair, neither of the one acoustic emission sensor or the another acoustic emission sensor in the second pair being shared with the first pair.

22. A non-transitory computer readable storage medium storing instructions for execution by a computing device to perform an intruder detection method, the method comprising:
receiving a first signal produced by one acoustic emission sensor within a first pair of acoustic emission sensors, in a cluster of a plurality of acoustic emission sensors, arranged beneath the surface of a body of water, the cluster defining the first pair and a second pair of acoustic emission sensors, the first signal being produced in response to said one acoustic emission sensor detecting a first acoustic emission generated by and emanating from a source, receiving a second signal produced by another acoustic emission sensor within the first pair, the second signal being produced in response to said another acoustic emission sensor detecting the first acoustic emission generated by and emanating from the source, and receiving at least a third signal produced by one acoustic emission sensor within the second pair, the third signal being produced in response to said one acoustic emission sensor within the second pair detecting a second acoustic emission generated by and emanating from the source;

determining a first cross-correlation factor between the first signal and the second signal based on a time difference between the detection of the first acoustic emission by the acoustic emission detectors of the first pair;

determining a second cross-correlation factor relating to at least the third signal and another signal from another acoustic emission sensor of the second pair, based on a time difference between the detection of the second acoustic emission by the acoustic emission sensors of the second pair;

determining a bearing to the source based on at least one of the first cross-correlation factor and the second cross-correlation factor; and determining a range to the source based on at least one of the first cross-correlation factor and the second cross-correlation factor.

23. The computer readable storage medium of claim 22, wherein the method further comprises:
analyzing one of the first signal and the second signal, together with at least one other signal representative of an acoustic emission sensor in a cluster of acoustic emission sensors detecting at least one other acoustic emission from the source, to determine if the one of the first signal and the second signal and the at least one other signal conform to a threat-type template.

24. The computer readable storage medium of claim 22, wherein the method further comprises:
determining whether the conformance of the one of the first signal and the second signal and the at least one other signal to the threat-type template persists as to a subsequent one of the first signal and the second signal and a subsequent at least one other signal for some threshold period of time.

25. The machine readable medium of claim 22, the method further comprising, wherein the first pair and the second pair share a common acoustic emission sensor.

26. The machine readable medium of claim 25, the method further comprising, wherein the first acoustic emission and the second acoustic emission are the same acoustic emission.

27. The machine readable medium of claim 22, the method further comprising, wherein the first acoustic emission and the second acoustic emission are the same acoustic emission.

28. The machine readable medium of claim 22, the method further comprising:
   determining a first bearing to the source based on the first cross correlation factor and a second bearing to the source based on the second cross correlation factor; and
   determining a range to the source based on the intersection of the first bearing and the second bearing.

29. The machine readable medium of claim 22, wherein the at least a third signal produced by one acoustic emission sensor within the second pair, comprises a third signal produced by said one acoustic emission sensor in the second pair and a fourth signal being produced by another acoustic emission sensor in the second pair, neither of the one acoustic emission sensor or the another acoustic emission sensor in the second pair being shared with the first pair.

* * * * *